(12) United States Patent
Terzian

(10) Patent No.: US 7,479,715 B2
(45) Date of Patent: Jan. 20, 2009

(54) OMNIDIRECTIONAL ELECTRICAL GENERATORS

(75) Inventor: Berj A. Terzian, Newbury, MA (US)

(73) Assignee: Incelex, LLC, Newbury, MA (US)

( * ) Notice: Subject to any disclaimer, the term of this patent is extended or adjusted under 35 U.S.C. 154(b) by 359 days.

(21) Appl. No.: 11/464,275

(22) Filed: Aug. 14, 2006

(65) Prior Publication Data

US 2008/0036306 A1  Feb. 14, 2008

(51) Int. Cl.
*H02K 35/00* (2006.01)
(52) U.S. Cl. .............................. 310/15; 310/181; 310/12
(58) Field of Classification Search .................. 310/15, 310/12, 181, 23, 24, 36, 14
See application file for complete search history.

(56) References Cited

U.S. PATENT DOCUMENTS

| 6,483,219 | B2 * | 11/2002 | Nikolic et al. | 310/178 |
| 6,812,583 | B2 * | 11/2004 | Cheung et al. | 290/1 R |
| 7,023,122 | B2 * | 4/2006 | Gang | 310/181 |
| 2002/0081220 | A1 * | 6/2002 | Ota et al. | 417/410.5 |

* cited by examiner

*Primary Examiner*—Gary F. Paumen
(74) *Attorney, Agent, or Firm*—Lucas & Mercanti, LLP

(57) ABSTRACT

Electrical generators are provided by causing permanent magnets to travel through hollow passageways having electrical conductors flanking or surrounding the space within the passageways. The conductors are disposed in undulating patterns the amplitudes of which are aligned in selected correlated positions relative to the lengths of the passageways and directions of the magnetic flux lines in order to maximize the electromagnetically generated voltage and current in the conductors.

20 Claims, 3 Drawing Sheets

OMNIDIRECTIONAL ELECTRICAL GENERATORS

BACKGROUND OF THE INVENTION

1. Field of the Invention

This invention relates to electrical generators which can be incorporated in electrically or electronically operated devices to render them capable of self generating electricity therein when put into physical motion either manually or mechanically, without need for access to external electrical sources.

2. Drawbacks of Prior Systems

The present applicant is a co-inventor of prior inventions described in earlier filed, copending applications identified by the following serial numbers and titles:

Ser. No. 11/120,255 Self Powered Cell Phone
Ser. No. 11/130,093 Automated Motion Provider for Self Powered Cell Phones
Ser. No. 11/191,890 Armature Type Electrical Generators for Self Powered Cell Phones
Ser. No. 11/199,309 Enhanced Internal Electrical Generators
Ser. No. 11/328,661 Optimized Electrical Generators.

The disclosures of these earlier applications are incorporated by reference herein.

These previous systems are based on a variety of designs which operate by intersection of electrical conductors and magnetic flux lines of permanent magnets brought about by relative motion between such components, which induces electromagnetic generation of electrical voltage and current in the conductors by the Faraday effect.

Working prototypes of some of the earlier designs have confirmed their capability of producing useful electricity for powering portable products, such as cell phones, I-pods, MP3 players, etc. However, their designs leave room for improvement as regards maximizing the electrical outputs they can generate.

3. SUMMARY OF THE INVENTION

The present invention provides improvements in the level of electrical output generated due to modification of some of the earlier described designs. Notably, in the modified designs of the present invention, electrical conductors are disposed in new undulating patterns having predetermined amplitude and period, for example, square waves, or sinusoidal or sawtooth waveforms, and these patterns are correlated directionally to the directions of the magnetic flux lines of alternative permanent magnets, during the course of relative motion between these elements. As a result, the conductors are caused to intersect the magnetic flux lines in virtually completely perpendicular directions, which maximizes the electromagnetically generated voltage and current in the conductors, thus providing useful improvement of power output over the prior designs.

4. BRIEF DESCRIPTION OF THE DRAWINGS

Further details of the present invention will be readily understood by reference to the following drawings of which:

5. DETAILED DESCRIPTION OF THE INVENTION

Figure 1:
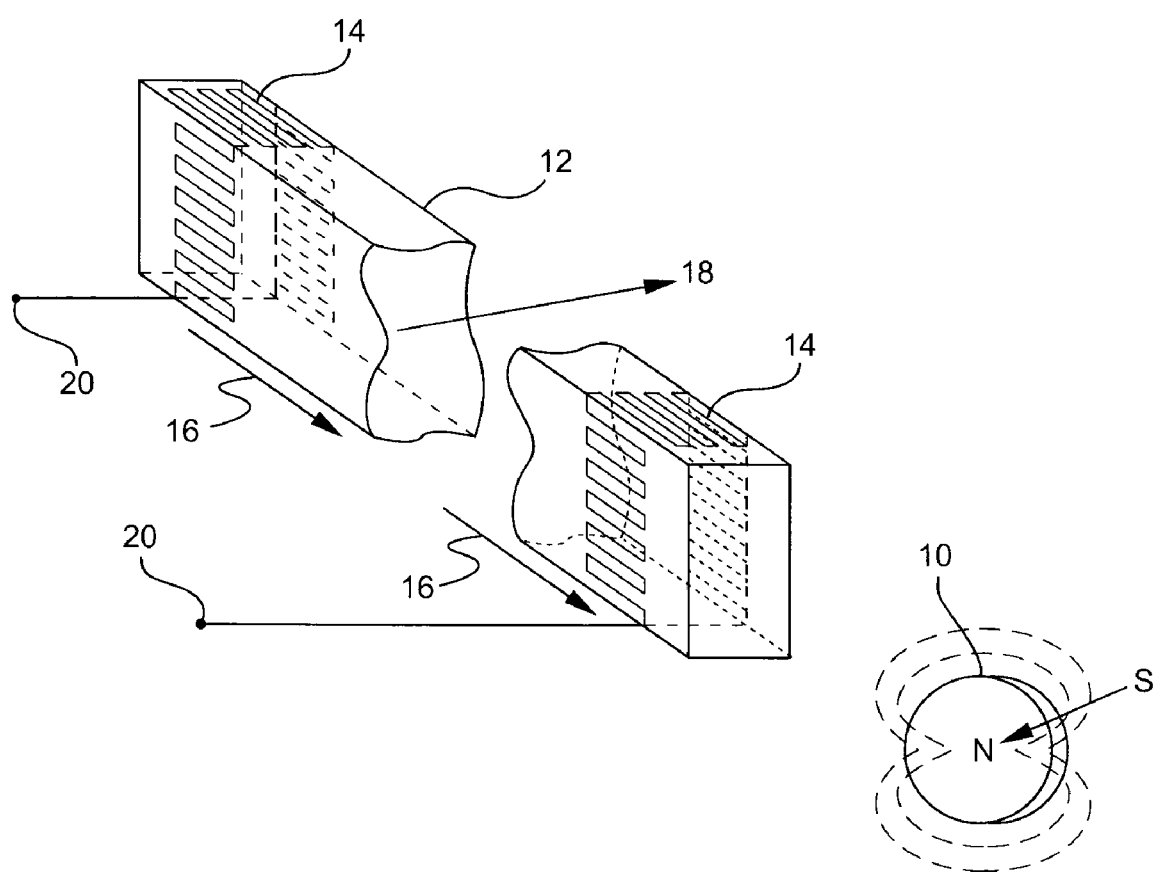
FIG. 1 is an exploded perspective view of a first embodiment of the invention.

Referring to FIG. 1, illustrated there is a disc-shaped, permanent magnet 10, the opposite magnetic poles of which are located on the opposite faces of the magnet. Thus, the north pole is the face marked N, and south pole is on the opposite face (not in view) designated by chain line S. As a result, the magnetic flux lines of magnet 10 extend outwardly and over and across its edge between its opposite poles. Thus, the flux lines form a magnetic cloud or envelope which is oriented substantially parallel to the central axis of the poles projected through the thickness of magnet 10.

Reference numeral 12 denotes a hollow passageway having a rectangular cross-section. The passageway has a predetermined length and has been divided into two sections in FIG. 1 for ease of reference and description.

In both sections, passageway 12 is wrapped on its walls with electrical conductors formed in a pattern of repeating square waves 14 having predetermined amplitude and period. The amplitudes of waves 14 are aligned parallel to the length of passageway 10, as designated by arrows 16.

Magnet 10 is inserted in passageway 12 with slight clearances between its edge and faces, and the internal walls of the passageway. Thereafter, the ends of passageway 12 are closed to seal the magnet 10 within the passageway.

When the resulting assembly is oriented with the passageway's cross-section and the magnet's faces vertically upright, it can be oscillated or rotated about an axis projected through the passageway's thickness, denoted by arrow 18, to cause magnet 10 to roll on its edge back and forth through the passageway. This will bring the magnetic flux lines of magnet 10 into intersection with conductors 14 to generate electrical voltage and current in the conductors 14. Since the amplitudes of conductors 14 are aligned almost completely parallel to the length of passageway 12, they intersect the magnetic flux lines at nearly complete right angles relative to the broadsided linearity of the flux lines extending over and across the edge and faces of magnet 10, thus maximizing the electromagnetically generated electrical output of the conductors at terminals 20.

From terminals 20, the electrical current can be transmitted to the operating circuit, or a storage battery or a capacitor of a cell phone, I-pod, MP3 player or similar devices.

Figure 2:
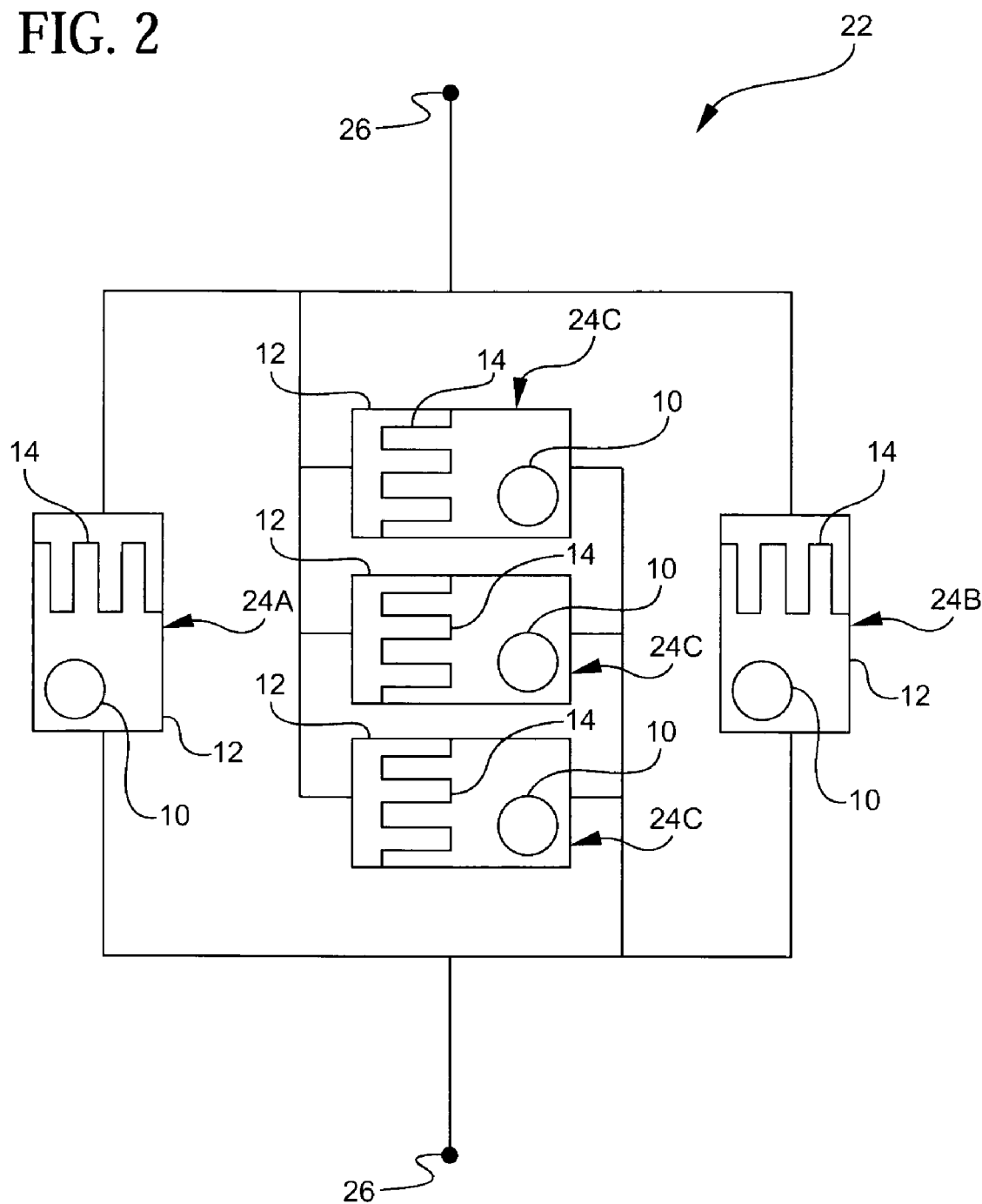
FIG. 2 is a schematic circuit containing five of the embodiments of FIG. 1 in an electrical/physical configuration designed for use in cell phones or similar portable devices.

Referring to FIG. 2, it illustrates a circuit 22 designed to be placed within the housing of a cell phone and used to self generate omnidirectional electric voltage and current as the cell phone is oscillated or rotated through multiple directions.

In particular, circuit 22 includes five of the generators of FIG. 1, denoted by reference numerals 24A-C. Generators 24A, B are aligned at the opposite sides of the cell phone in positions parallel to themselves and the cell phone's height. Generators 24C are placed between generators 24A, B in positions parallel to themselves and to the cell phone's width. As illustrated symbolically, the amplitudes of the square wave conductors are again aligned parallel with the length of the passageway.

When the cell phone is held vertically upright and oscillated or rotated about an axis through its depth, the three magnets 10 of generators 24C will roll back and forth through the three passageways 12 to self generate electrical voltage and current in conductors 14. When the cell phone is held with the generators 24A, B vertically upright and the lengths of the two passageways oriented parallel to the horizon, oscillation or rotation of the cell phone about an axis through its depth will also cause electromagnetic self generation of voltage and current in the conductors 14.

It should be noted that the amplitudes of the conductors 14 in the five generators of FIG. 2 have the same parallel alignment to the lengths of their respective passageways in order to obtain the same right angle intersection of them through the magnetic fluxes of the magnets 10. In addition, all five generators 24A-C are connected in parallel with respect to each other and relative to the output terminals 26 of the entire circuit. Therefore, this design will provide maximum generation of current at the output terminals 26, as the cell phone is moved in omnidirectional motions either manually or mechanically.

Figure 3:
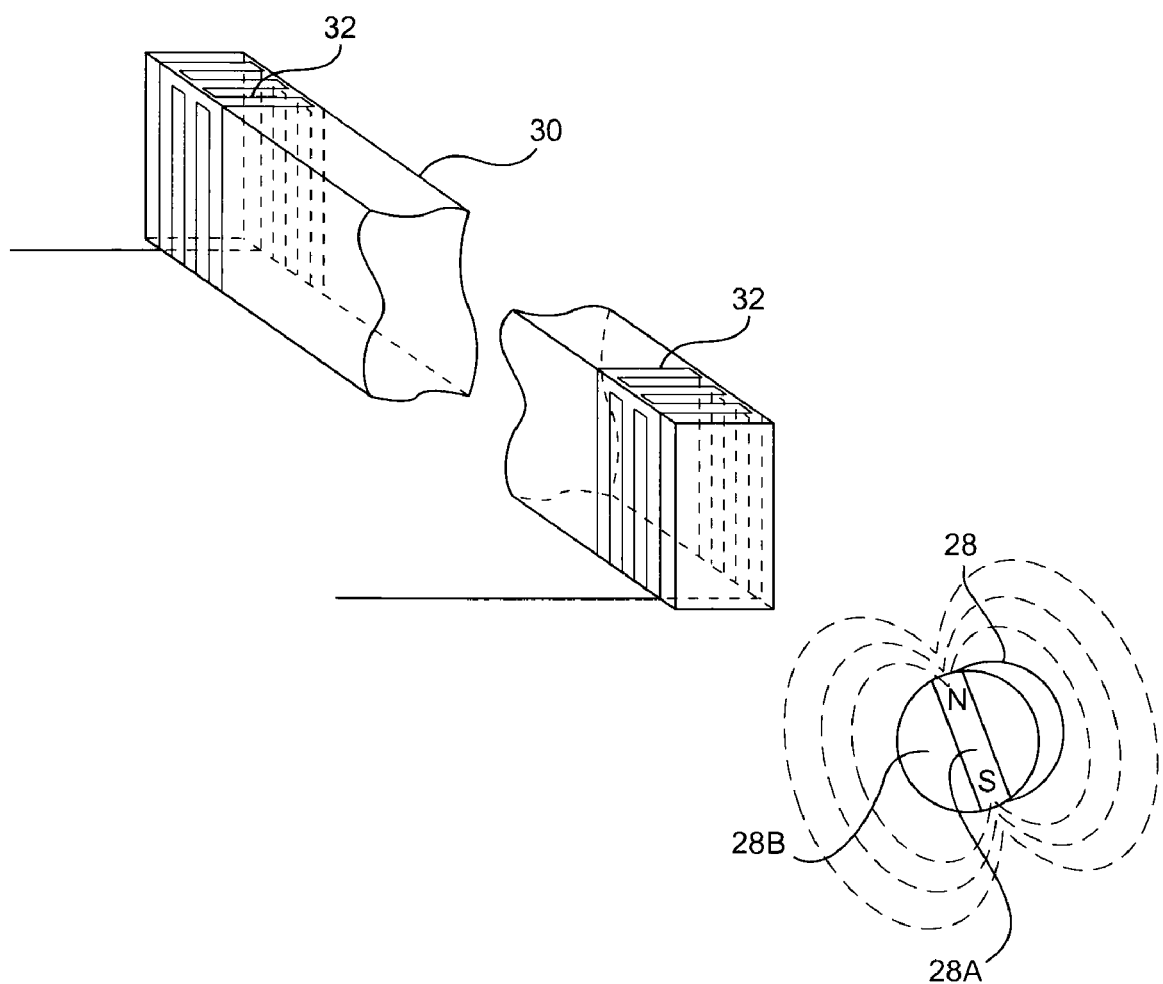
FIG. 3 is similar to FIG. 1 and provides an exploded perspective view of a second embodiment of the invention.

Referring to FIG. 3, this depicts an alternative design to FIG. 1. In particular, magnet 28 comprises a bar magnet 28A supported in a disc-shaped carrier 28B. Therefore, the magnetic flux lines of magnet 28A extend in a parallel direction from and across a diameter between its opposite poles N-S, which is perpendicular to the transverse flux lines of the magnet 10 in FIG. 1. Therefore, passageway 30 in FIG. 3 is wrapped with square wave conductors 32 the amplitudes of which are aligned in transverse directions relative to the length of passageway, rather than the parallel alignment of FIG. 1. This modification is necessary to preserve the nearly complete right angle intersections of the conductors 32 with the magnetic flux lines of bar magnet 28A in FIG. 3

In the foregoing description, oscillation or rotation of the disclosed embodiments about specified axes are ideal for causing the magnets to roll on their edges through the hollow passageways with minimum frictional resistance to such travel or motion. However, this is not a necessity but only a preferred method of operation. Cell phones or other devices or products equipped with one or more electrical generators of the present invention can be vigorously shaken or moved through many different directions to obtain the advantages described for the rolling magnet embodiments of FIGS. 1-3.

The invention has been described in terms of its functional principles and several illustrative embodiments. It should be understood that it is intended to cover all variations or modifications of the illustrative embodiments which are encompassed within the scope of the appended claims and all equivalents thereof.

The following is claimed:

1. An electrical generator which comprises:
    (a) a disc-shaped member having permanent magnetism and magnetic poles of opposite polarity on its opposite faces;
    (b) a hollow passageway having a predetermined length and configured to enable the disc-shaped member to travel through it;
    (c) at least one set of electrical conductors disposed in an undulating pattern of predetermined amplitude and affixed to at least a selected portion of the passageway, the amplitude of the undulating electrical conductors being oriented in a direction relative to the length of the passageway which causes successive excursions of the conductors to intersect the magnetic flux lines between the magnetic poles at substantially right angles as the disc-shaped member travels through the passageway, thereby maximizing the electromagnetically generated voltage and current in the electrical conductors during such travel.

2. A generator according to claim 1 wherein the passageway has a rectangular cross-section which enables the disc-shaped member to roll on its edge through the passageway when the member and passageway are oriented vertically.

3. A generator according to claim 2 wherein the entirety of the disc-shaped member is permanently magnetized with its magnetic poles of opposite polarity located on its opposite faces, and the amplitude of the electrical conductors is oriented in a direction parallel to the length of the passageway.

4. A generator according to claim 3 wherein the undulating pattern is substantially a square wave, a sinusoidal wave or a sawtooth wave.

5. A generator according to claim 4 wherein multiple sets of the electrical conductors are affixed to multiple portions of the passageway with spaces in between the sets, whereby successive pulses of voltage and current are generated in the multiple sets of conductors as the disc-shaped member rolls through the passageway.

6. An omnidirectional electrical generator which comprises:
    (a) at least one pair of disc-shaped members each having permanent magnetism and magnetic poles of opposite polarity on its opposite faces;
    (b) at least one pair of hollow passageways having predetermined lengths and each configured to enable each disc-shaped member to travel through the respective passageways;
    (c) at least two sets of electrical conductors each disposed in an undulating pattern of predetermined amplitude and affixed to a selected portion of each passageway, the amplitude of each undulating pattern being oriented in a direction relative to the length of the passageway which causes successive excursions of the conductors to intersect the magnetic flux lines between the magnetic poles at substantially right angles as each disc-shaped member travels through each passageway;
    (d) one combination of the passageway and disc-shaped member being placed in a selected position within the housing of an electrically or electronically operated device, and the other combination of the passageway and disc-shaped member being placed in a different selected position within the housing, whereby oscillation or rotation of the housing and concomitant travel of each member through each passageway will cause maximum electromagnetic generation of voltage and current in the electrical conductors as the housing moves through different directions in space.

7. A generator according to claim 6 wherein the two combinations of passageway and disc-shaped members are positioned within the housing at approximately a right angle relative to each other.

8. A generator according to claim 6 wherein each passageway has a rectangular cross-section which enables one or the other of the disc-shaped members to roll on its edge through its passageway when the members and passageways are oriented vertically.

9. A generator according to claim 8 wherein the entirety of each disc-shaped member is permanently magnetized with its magnetic poles of opposite polarity located on its opposite faces, and the amplitudes of the two sets of electrical conductors are each oriented in a direction parallel to the length of the passageway.

10. A generator according to claim 9 wherein the undulating patterns are substantially square waves, sinusoidal waves or sawtooth waves.

11. A generator according to claim 10 wherein multiple combinations of passageways and disc-shaped members are placed in different positions within the housing of an electrically or electronically operated product, whereby oscillation or rotation of the housing and concomitant travel of each member through each passageway will maximize electromagnetic generation of voltage and current in the electrical conductors as the housing moves through different directions in space.

12. A generator according to claim 5 placed within the housing of an electrically or electronically operated product, whereby oscillation or rotation of the housing and concomitant travel of each member through each passageway will cause maximum electromagnetic generation of voltage and current in the electrical conductors as the housing moves through different directions in space.

13. A generator according to claim 12 placed within the housing of a cell phone, I-pod or MP3 player.

14. A generator according to claim 11 placed within the housing of a cell phone, I-pod or MP3 player.

15. An electrical generator which comprises:
   (a) a permanent bar magnet having magnetic poles of opposite polarity at its ends and being disposed in a disc-shaped carrier;
   (b) a hollow passageway having a predetermined length and configured to enable the disc-shaped carrier to travel through the passageway;
   (c) at least one set of electrical conductors disposed in an undulating pattern of predetermined amplitude and affixed to at least a selected portion of the passageway, the amplitude of the undulating conductors being oriented in a direction relative to the length of the passageway which causes successive excursions of the conductors to intersect the magnetic flux between the magnetic poles at substantially right angles as the disc-shaped carrier travels through the passageway, thereby maximizing the electromagnetically generated voltage and current in the electrical conductors during such travel.

16. A generator according to claim 15 wherein the passageway has a rectangular cross-section which enables the disc-shaped carrier to roll on its edge through the passageway when the member and passageway are oriented vertically.

17. A generator according to claim 16 wherein the amplitudes of the electrical conductors are oriented in a direction transverse to the length of the passageway.

18. A generator according to claim 17 wherein multiple sets of the electrical conductors are affixed to multiple portions of the passageway with spaces in between the sets, whereby successive pulses of voltage and current are generated in the multiple sets of conductors as the disc-shaped carrier rolls through the passageway.

19. A generator according to claim 15 wherein multiple combinations of the disc-shaped carrier and the passageway are placed in different positions within the housing of an electrically or electronically operated device, whereby oscillation or rotation of the housing and concomitant travel of each member through each passageway will cause maximum electromagnetic generation of voltage and current in the electrical conductors as the housing moves through different directions in space.

20. A generator according to claim 15 placed within the housing of a cell phone, I-pod or MP3 player.

* * * * *